United States Patent [19]
Nakagawa et al.

[11] Patent Number: 6,088,513
[45] Date of Patent: *Jul. 11, 2000

[54] METHOD OF PROCESSING DATA BY PERFORMING A PREDETERMINED OPERATION BETWEEN A CURRENT AND PRECEDING RASTER AND COMPRESSING THE RESULTANT DATA

[76] Inventors: Yoshihiro Nakagawa, c/o Canon Kabushiki Kaisha, 30-2, 3-chome, Shimomaruko, Ohta-ku; Masao Sasaki, c/o Canon Software Inc., Mita Miyoshi Bldg. 9-7, Mita 3-chome, Minato-ku, both of Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 07/996,787

[22] Filed: Dec. 23, 1992

[30] Foreign Application Priority Data

Dec. 27, 1991 [JP] Japan .................................. 3-346045

[51] Int. Cl.[7] .................................................... G06F 15/20
[52] U.S. Cl. ........................................... 395/114; 315/115
[58] Field of Search ..................................... 395/108, 114, 395/101, 116, 115, 117, 109, 110, 106; 900/121

[56] References Cited

U.S. PATENT DOCUMENTS

| | | | |
|---|---|---|---|
| 4,313,124 | 1/1982 | Hara ..................................... | 346/140 R |
| 4,345,262 | 8/1982 | Shirato et al. ........................ | 346/140 R |
| 4,459,600 | 7/1984 | Sato et al. ............................. | 346/140 R |
| 4,463,359 | 7/1984 | Ayata et al. ............................. | 346/1.1 |
| 4,558,333 | 12/1985 | Sugitani et al. ...................... | 346/140 R |
| 4,578,714 | 3/1986 | Sagiura et al. ........................... | 358/283 |
| 4,723,129 | 2/1988 | Endo et al. .............................. | 346/1.1 |
| 4,740,796 | 4/1988 | Endo et al. .............................. | 346/1.1 |
| 5,150,454 | 9/1992 | Wood et al. ............................. | 395/114 |
| 5,165,072 | 11/1992 | Kurita et al. ............................ | 358/448 |
| 5,199,803 | 4/1993 | Shimizu et al. ......................... | 395/108 |
| 5,207,517 | 5/1993 | Ito ........................................... | 395/114 |
| 5,212,770 | 5/1993 | Smith et al. ............................ | 345/335 |
| 5,270,728 | 12/1993 | Lund et al. .............................. | 400/121 |
| 5,299,292 | 3/1994 | Kadowaki et al. ...................... | 395/101 |
| 5,301,267 | 4/1994 | Hassett et al. .......................... | 345/469 |
| 5,335,299 | 8/1994 | Atkinson .................................. | 382/56 |
| 5,354,135 | 10/1994 | Sakagami et al. ...................... | 395/108 |
| 5,374,943 | 12/1994 | Lehmann et al. .......................... | 347/9 |
| 5,377,312 | 12/1994 | Kobayashi .............................. | 395/116 |
| 5,502,804 | 3/1996 | Butterfield et al. ..................... | 707/502 |

FOREIGN PATENT DOCUMENTS

| | | |
|---|---|---|
| 1336015 | 6/1995 | Canada . |
| 188800 | 12/1984 | European Pat. Off. ......... H04N 1/40 |
| 309655 | 9/1987 | European Pat. Off. ....... H04N 1/419 |
| 59-123670 | 7/1984 | Japan ................................ B41J 3/04 |
| 59-138461 | 8/1984 | Japan ................................ B41J 3/04 |
| 2208059 | 2/1989 | United Kingdom . |

*Primary Examiner*—Steven Sax
*Attorney, Agent, or Firm*—Fitzpatrick, Cella, Harper & Scinto

[57] ABSTRACT

At a data output apparatus side, raster image information, which is obtained by means of performing an exclusive OR operation between raster image information on the preceding line and raster image information on the current line, is compression-processed in a raster direction and then transmitted to a data processing apparatus. In the data processing apparatus, the received image information is expansion-processed, an exclusive OR operation between image information after the expansion and image information on the preceding line is carried out, and a processing for recording and the like is performed taking the thus obtained information as the raster image information on the current line. Thus it is possible to provide a higher compression rate of the image information with a simple processing and to improve a processing speed.

11 Claims, 6 Drawing Sheets

METHOD OF PROCESSING DATA BY PERFORMING A PREDETERMINED OPERATION BETWEEN A CURRENT AND PRECEDING RASTER AND COMPRESSING THE RESULTANT DATA

BACKGROUND OF THE INVENTION

1. Field of the Invention

The present invention relates to a method of processing data.

2. Related Background Art

Hitherto, there is known a system for recording data output from a host system such as a personal computer, using a recording apparatus.

In such a system, an interface of a parallel or an asynchronous type is generally employed between the host computer and the recording apparatus.

According to a serial interface, there are such advantageous points that a dual directional communication is available, and in addition the number of signal wires are reduced and thus a connector is miniaturized. On the other hand, there is a defect that a transfer rate is slow. Thus, in a case where image data is transmitted from a host system to a recording apparatus having a high resolution and a large capacity of data, the transfer rate is slower than the recording speed of the recording apparatus.

In order to reduce the amount of data, there are employed in the communication line various effective data compression schemes in units of bits. Those conventional schemes, however, have a drawback that while the compression rate is high, it takes much time for the compression and expansion using a software.

It is possible to provide the expansion function with hardware at the recording apparatus end so as to increase the speed. However, there is no host system having hardware for such specific use. Thus, this scheme is not desired since it is a high in cost. Thus, it is required to provide a compression scheme capable of performing processing on a software basis. In view of those points, hitherto, in a case where data transfer is performed in a raster direction, compression is performed in units of bytes in the horizontal direction, so that the amount of data is reduced. This is advantageous in compression only when the same data continues over plural bytes in the horizontal direction, or when a repetitive pattern of block(s) is present. The reason why the compression is limited to one in units of bytes is that the processing rate of the software slows down significantly if it is one in units of bits, or a repetitive management of the same number of bits.

SUMMARY OF THE INVENTION

It is an object of the present invention to provide an improved data processing method.

It is another object of the present invention to provide a data processing method capable of implementing a high compression rate of image information with a simple processing, while also increasing the processing speed.

It is still another object of the present invention to provide a data processing method in which a predetermined compression processing is performed for information obtained by means of performing an exclusive OR operation between raster image information on the preceding line and raster image information on the current line.

It is still another object of the present invention to provide a data processing method in which a predetermined processing is performed for information obtained by means of performing an exclusive OR operation between image information output from a data output apparatus and image information on the preceding line, as image information on the current line.

It is still another object of the present invention to provide a data processing method comprising a data output apparatus in which compression processing is performed for information obtained by means of performing an exclusive OR operation between raster image information on the preceding line and raster image information on the current line, and then the processed information is output as a information on the current line, and a data processing apparatus adapted to receive the information output from said data output apparatus, and also to process the information obtained by means of performing an exclusive OR operation between information formed by expansion processing of the received information and image information on the preceding line, as raster image information on the current line.

The objects and features of the present invention will become more apparent from the consideration of the following detailed description taken in conjunction with the accompanying drawings.

DETAILED DESCRIPTION OF THE PREFERRED EMBODIMENTS

Preferred embodiments of the present invention will be described in detail with reference to the accompanying drawings.

As an example of a most advantageous application of the present invention, an ink jet recording apparatus or the like using thermal energy may be considered to use a serial scheme of recording having a serial interface. Such apparatus makes it possible to implement a high resolution of recording without reducing the recording speed. Further, the use of a small interface and a small diameter of cable makes it possible to miniaturize the apparatus. This example will be described hereinafter.

Figure 1:
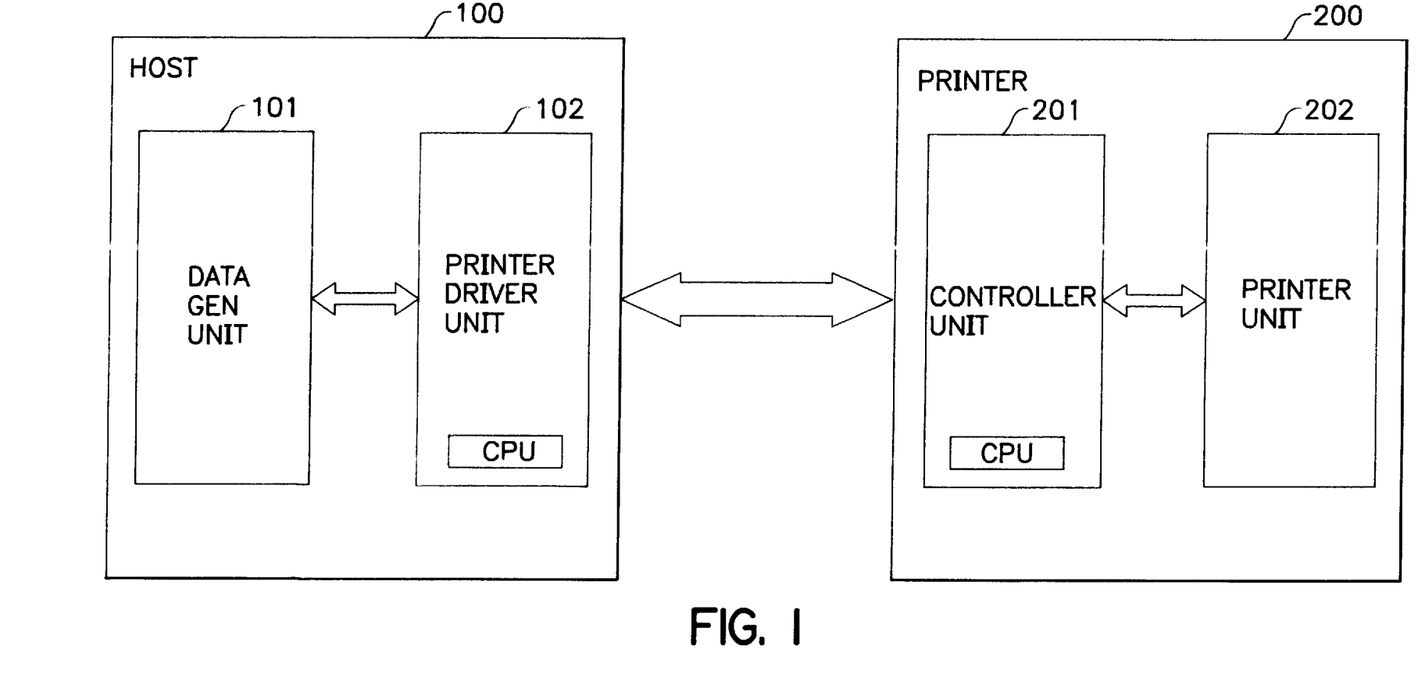
FIG. 1 is a block diagram showing a data processing system according to one embodiment to which the present invention is applicable.

FIG. 1 is a block diagram showing a data processing system according to one embodiment to which the present invention is applicable. In FIG. 1, reference numeral 100 denotes a host computer such as a personal computer or the like; 200 a printer adapted to record images in accordance with recording data transmitted from the host computer 100 through a serial interface such as RS-232C. According to the present embodiment, an image recording is performed in such a manner that the use of thermal energy causes an ink to induce a variation in state so that an ink droplet is emitted. Image data generated from data generation unit 101 are subjected to a compression processing in units of bytes in a horizontal direction and a vertical direction, as will be described concerning a printer driver unit 102, and then the processed data are transmitted to the printer 200. In addition the various commands are also transmitted through the printer driver unit 102 to the printer 200.

A controller unit 201 of the printer 200 performs reproduction of the data by means of implementing expansion processing, as described later, for the received data, and then the reproduced data are output to a printer unit 202. The printer unit 202 has a recording head which is provided with a plurality of ink orifices and a plurality of exothermic devices each corresponding to the associated one of the orifices. The exothermic devices are driven in accordance with data output from the controller unit 201 so that ink droplets are emitted on a recording medium to form an image.

An operation of the printer driver unit 102 at the host end will be described. First, an image recording position information is transmitted to the printer 200, and then data are transmitted in a predetermined form. An example will be described below.

Image data is basically constituted of 2 bytes or more. If the value of the first byte is one of values 0 to 127 (00-7F), non-compression data are followed by bytes of a number represented by the value +1 as to the subsequent data. On the other hand, if the first byte is one of values -1 to -127 (FF-81). the second byte of data is followed by a number represented by the absolute value of the value. The value 128 is ignored as a null.

A first raster is compressed only in a horizontal direction and then transmitted. Regarding the second raster and the rasters thereafter, an exclusive OR operation between the image data on the raster of interest and the original image data on the first raster or the preceding raster is carried out, and thereafter the compression in the horizontal direction, similar to the previous raster, is performed and then transmitted. Regarding the subsequent rasters, in a similar way, an exclusive OR operation involved in the preceding raster is carried out, and then the compression and transfer operations are performed.

Figure 3A:
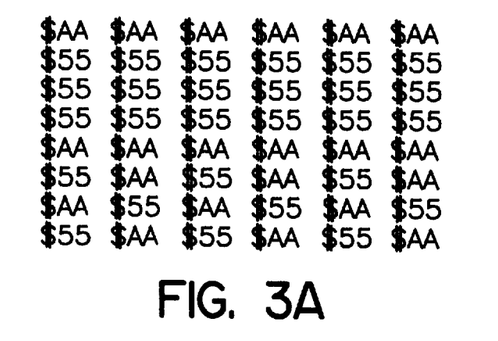
FIG. 3A is a view showing an original image data.
Figure 3B:
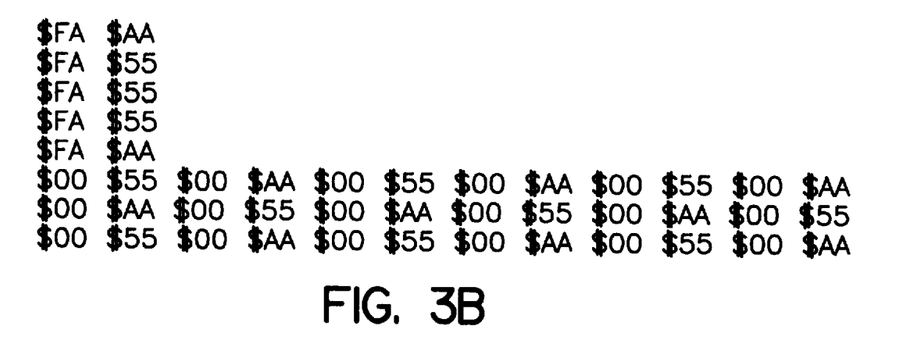
FIGS. 3B and 3C are views showing image data of post compression processing.

Referring to FIGS. 3A–3C, the following is a description of how the compression processing of image data is performed. FIG. 3A shows original image data. FIG. 3B shows data obtained by means of compression of the image data shown in FIG. 3A in a horizontal direction. As seen from FIG. 3A, data AA continuously appears on the first raster for 6 bytes, and thus they are compressed to be given by $FA, $AA as shown in FIG. 3B. In similar way, data on each of the second to fourth rasters are compressed to be given by $FA $55; and the fifth raster to $FA $AA. No continuous data appears on the 6th and 8th rasters and data 55 and AA appear alternately every three bytes, respectively, and thus the compressed data are expressed in the form of $00 $55 $00 $AA . . . $00 $55 $00 $AA. Also no continuous data appears on the 7th raster and data AA and 55 appear alternatively every three bytes, respectively, and thus the compressed data are expressed in the form of $00 $AA $00 $55 . . . $00 $AA $00 $55A.

Figure 3C:
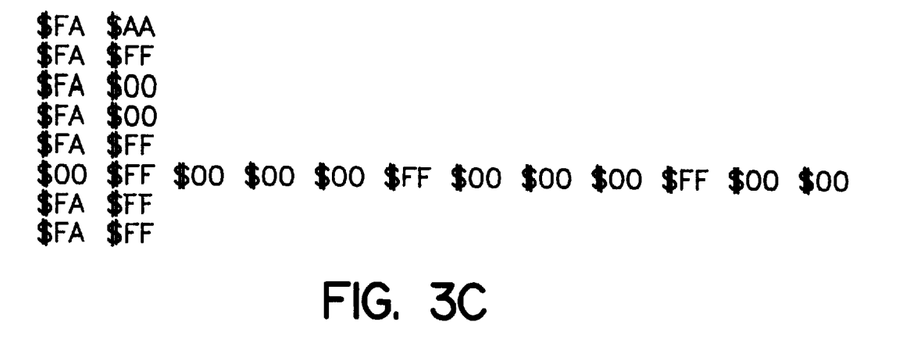

FIG. 3C is a view showing the result of the compression processing for the image data shown in FIG. 3A, according to the present invention. Regarding the first raster, it is subjected to the compression processing only in a horizontal direction, and thus, similar to FIG. 3B, it is expressed in the form of $FA $AA. Regarding the second raster, an exclusive OR operation with the original data on the first raster is performed. The exclusive OR operation between data AA and data 55 results in data FF, so that data FF continuously appear on the second raster for 6 bytes. Those are compressed in a horizontal direction to form $FA $FF. Regarding the third and fourth rasters, exclusive OR operations with the original data on the second and third rasters are performed, respectively. The exclusive OR operation between data 55 and data 55 results in data 00, so that data 00 continuously appear on the third and fourth rasters for 6 bytes, respectively. Those are compressed in a horizontal direction to form $FA $00. Regarding the fifth raster, it is similar to the second raster, and there are formed $FA $FF.

With respect to the sixth raster, an exclusive OR operation with the original data on the fourth raster is performed, so that data FF and 00 appear alternatively every three bytes, respectively, and thus the compressed data are expressed in the form of $00 $FF $00 $00 . . . $00 $FF $00 $00. Regarding the seventh and eighth rasters, exclusive OR operations with the original data on the sixth and seventh rasters are performed, respectively, so that data FF continuously appears on the respective raster every 6 bytes. Those are compressed in the horizontal direction to form $FA $FF.

Figure 2:
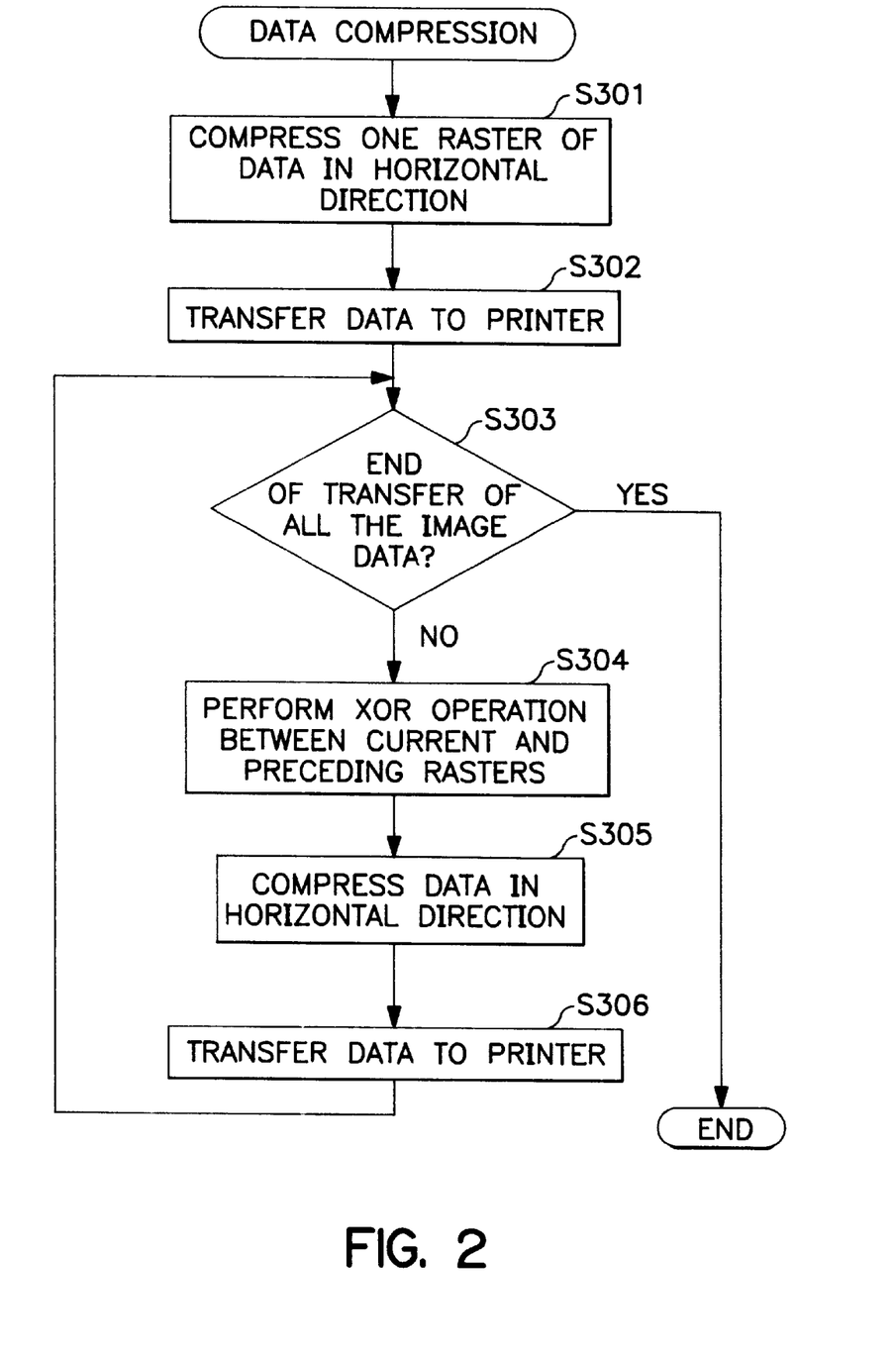
FIG. 2 is a flow chart useful for understanding a flow of the data compression processing.

FIG. 2 is a flow chart indicating the flow of the data compression processing which is implemented in the printer driver unit 102. A program according to this flow chart is stored in a ROM (Read Only Memory) within a CPU (not shown), of the printer driver unit 102. In step S301, first, a compression processing for image data of one raster is performed in a horizontal direction. And thereafter in step S302, the processed data is transferred to the printer 200. Next, in step S303, it is determined as to whether transfer of all the image data has been completed, and if not, then in step S304, performed is an exclusive OR operation between the original image data on the preceding raster and the image data on the current raster. In step S305, a compression processing for exclusive-ORed data is performed in a horizontal direction. In step S306, the processed data is transferred to the printer 200. The procedure of steps S303 to S306 is repeated until transfer of all the image data is completed.

Next, operation of the controller until 201 of the printer will be described. The controller unit 201 at the recording apparatus initiates development of the image data from a recording position to which data is first transmitted. The development of the first raster is performed based on the rule as described above, since the first raster is involved in only the compression in a horizontal direction. For the second raster and the subsequent rasters, there is selected as the image data on the subsequent raster a result of an exclusive OR operation between the developed data on the preceding raster and the expanded data of the transmitted data. Hereafter similarly, the exclusive OR operation is performed for each raster to reproduce the data.

Figure 4:
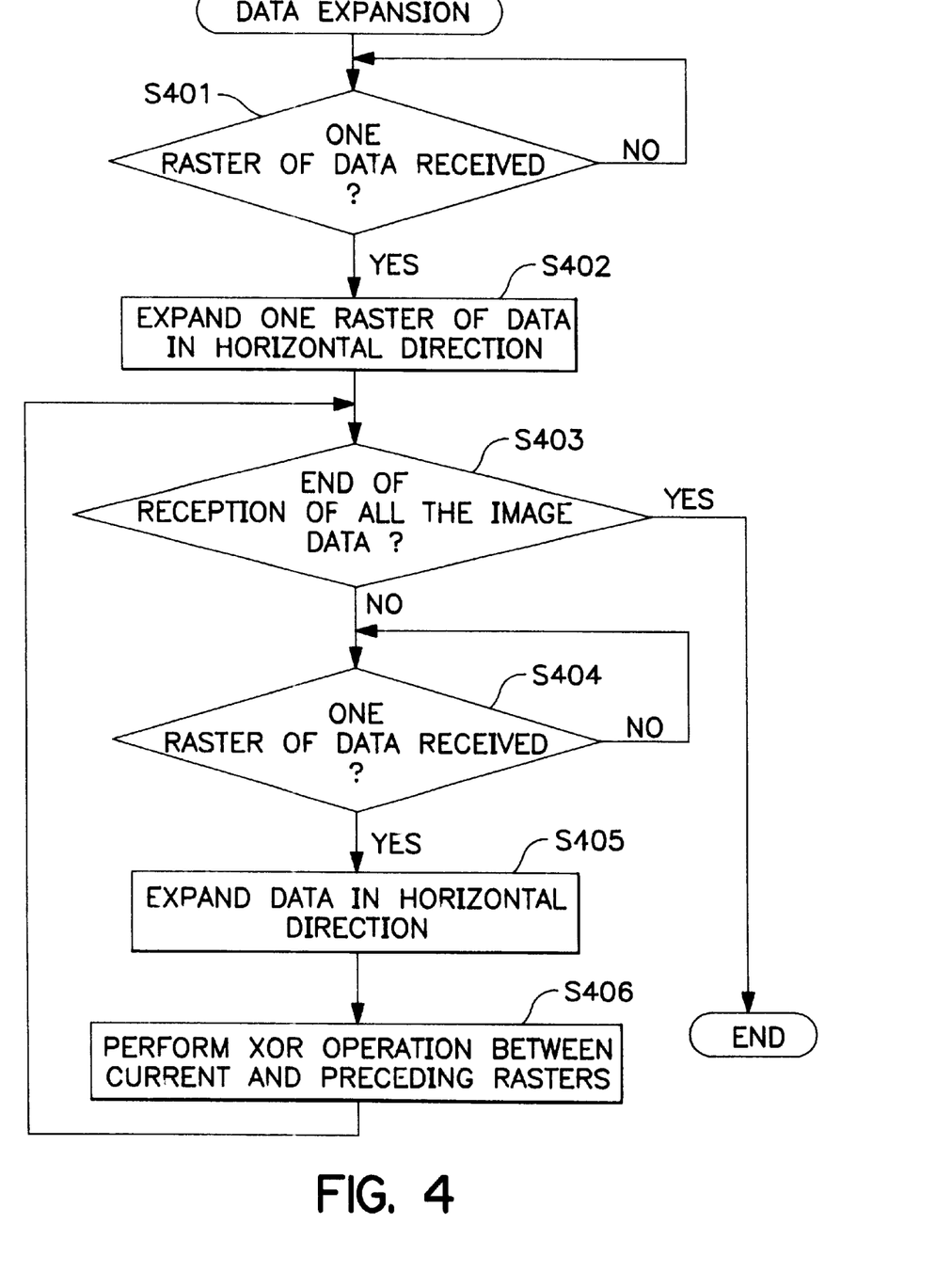
FIG. 4 is a flow chart useful for understanding a flow of the data expansion processing.

FIG. 4 is a flow chart indicating a flow of the data expansion processing which is implemented in the controller unit 201. A program according to this flow chart is stored in a ROM (Read Only Memory) within a CPU (not shown), of the controller unit 201. In step S401, first, if data of one raster is received, then in step S402 expansion of the data is performed in a horizontal direction and thereafter the expanded data is transferred to the printer unit 202. Next, in step S403, it is determined as to whether receipt of all the image data has been completed, and if not, then in step S404, it is waited to receive the next raster of data, and if received, then in step S405, the data is expanded in a horizontal direction. In step S406, data obtained by means of performing an exclusive OR operation between the expanded data and data on the preceding line is transferred, as data on the current raster, to the printer unit 202. The procedure of steps S403 to S406 is repeated until receipt of all the image data is completed.

According to the above-described compression and expansion scheme, if rasters continuously occur having the same data in a vertical direction, the exclusive OR operation involved in those data results in a zero. Thus, also regarding the characters or the like, a portion which continues in a vertical direction may be designated by a 0. In other words, only portions of the outline remain as data. Thus, there will be increased such a probability that 0 continuously occurs by means of compression in a horizontal direction. As a result the compression rate will be improved. Further, in case of high resolution of the image data, it often happens that the portion encircled by the outline of the character exceeds 8 pixels (one byte) so that there is no problem even if the compression in the horizontal direction is not involved in ones in units of bits. Further, with respect to the graphic data, particularly data whose resolution is lower than that of the printer employed, it is possible to expect a remarkable effect because there is a high probability of occupation of the repeated portions of the preceding raster.

Figure 5:
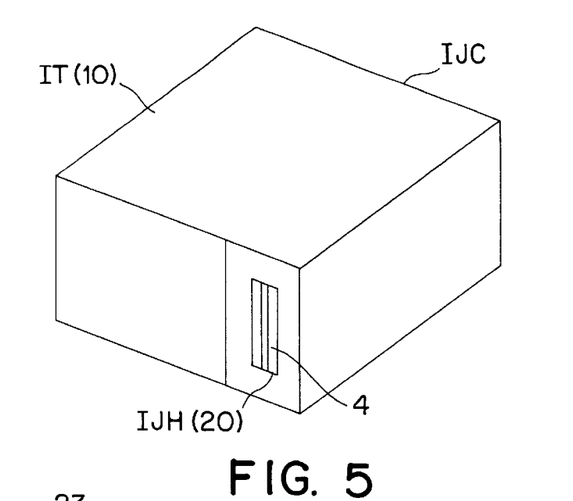
FIG. 5 is a perspective view showing a recording head.
Figure 6:
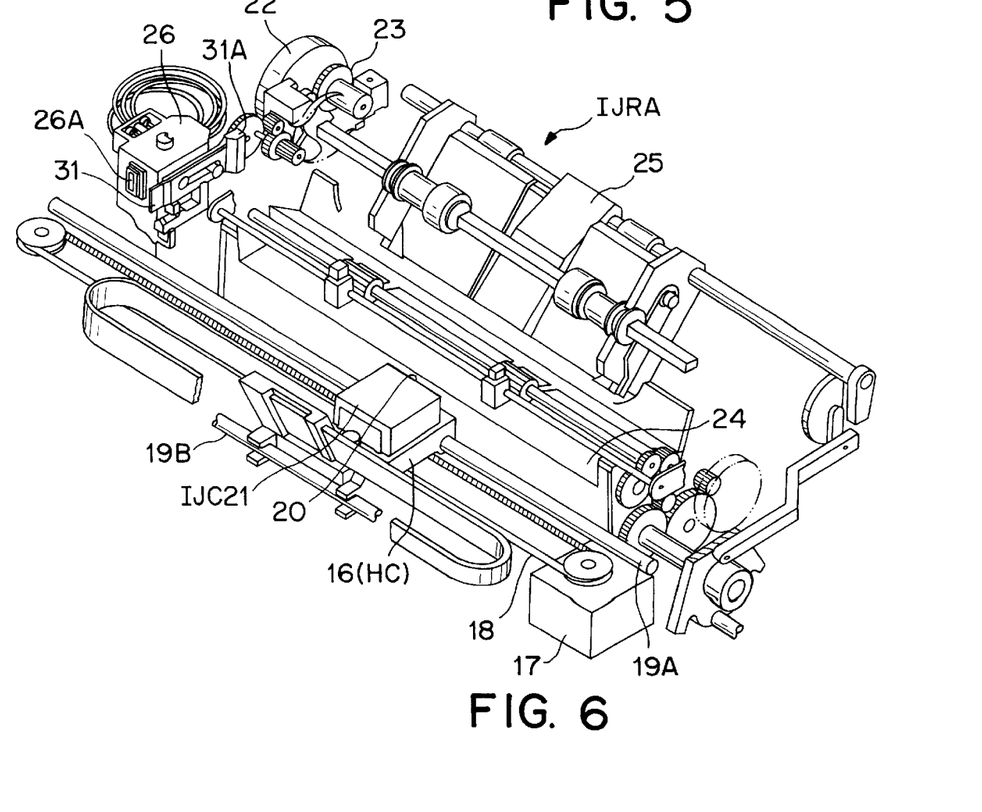
FIG. 6 is a schematic perspective view of an ink jet recording apparatus.

Next, the operation of the printer unit 202 will be described. FIGS. 5 and 6 illustrate an example of the printer to which a data processing method according to the present invention is applicable. There are shown an ink jet head (IJH) (recording head) 20 of a system for discharging ink toward a recording sheet, utilizing bubbles generated by thermal energy; a detachable ink jet cartridge (IJC) 21 integrated with the ink jet head (IJH) 20 and equipped with an ink tank (IT) 10 for supplying ink to the ink jet head; and the main body of the ink jet recording apparatus (IJRA).

In the ink jet cartridge IJC of the present embodiment, as will be apparent from a perspective view in FIG. 5, the ink jet head IJH slightly protrudes from the front face of the ink tank IT. The ink jet cartridge IJC is of a disposable type, detachably mounted on a carriage HC of the ink jet recording apparatus IJRA, as will be explained later.

A first ink tank IT (10), containing ink for supplying to the ink jet head IJH, is composed of an ink absorbent member, a container therefor and a cover member for closing the container (both not illustrated). The ink tank IT (10) is filled with ink and supplies the ink to the ink jet head according to ink discharge therefrom.

In the present embodiment, a front plate 4 is composed of a resinous material with high ink resistance, such as polysulfone, polyethersulfone, polyphenylene oxide or polypropylene.

The ink jet cartridge IJC of the above-explained structure is detachably mounted on the carriage HC of the ink jet recording apparatus IJRA as will be explained in the following, and effects formation of a recorded image by relative movement of the carriage HC and a recording material, in response to the entry of a recording signal.

FIG. 6 is a perspective view of an example of the ink jet recording apparatus IJRA equipped with mechanism for the above-mentioned operations.

Referring to FIG. 6, the ink jet head 20 of the ink jet cartridge IJC is provided with nozzles for discharging ink toward a recording surface of a recording sheet supplied from a sheet feeding unit 25 onto a platen 24. A carriage (HC) 16, for supporting the recording head 20, is linked with a part a driving belt 18 for transmitting the driving force of a driving motor 17, and is capable of reciprocating over the entire width of the recording sheet by sliding along two mutually parallel guide shafts 19A and 19B.

A head recovery unit 26, positioned at an end of the moving path of the recording head 20, for example at a position corresponding to the home position of the recording unit 20, effects capping therefor when activated by a motor 22 through a transmission mechanism 23. In combination with the capping operation by a cap 26A, there is conducted a discharge recovery operation by ink suction (suction recovery) by a suitable suction means (for example a suction pump) provided in the head recovery unit 26, thereby inducing forced discharge (idle discharge) of viscosified ink from the discharge openings. Also the recording head is protected by means of the capping for example after the recording operation. Such a discharge recovery operation is conducted at turn on of the power supply, at the replacement of the recording head, or at a pause in the recording operation exceeding a predetermined time.

A wiping blade 31, positioned at a side of the head recovery unit 26 and made of silicone rubber, is supported in a cantilever mechanism by a blade support member 31A and is also activated by the motor 22 and the transmission mechanism 23 for engagement with the ink discharging surface of the recording head 20. Thus the blade 31 is made to protrude into the moving path of the recording head 20 at a suitable timing in the course of recording operation thereof or after the discharge recovery operation therefor by the recovery unit 26, thereby wiping the dew, liquid or dusts off the ink discharging surface of the recording head 20 by the movement thereof.

Figure 7:
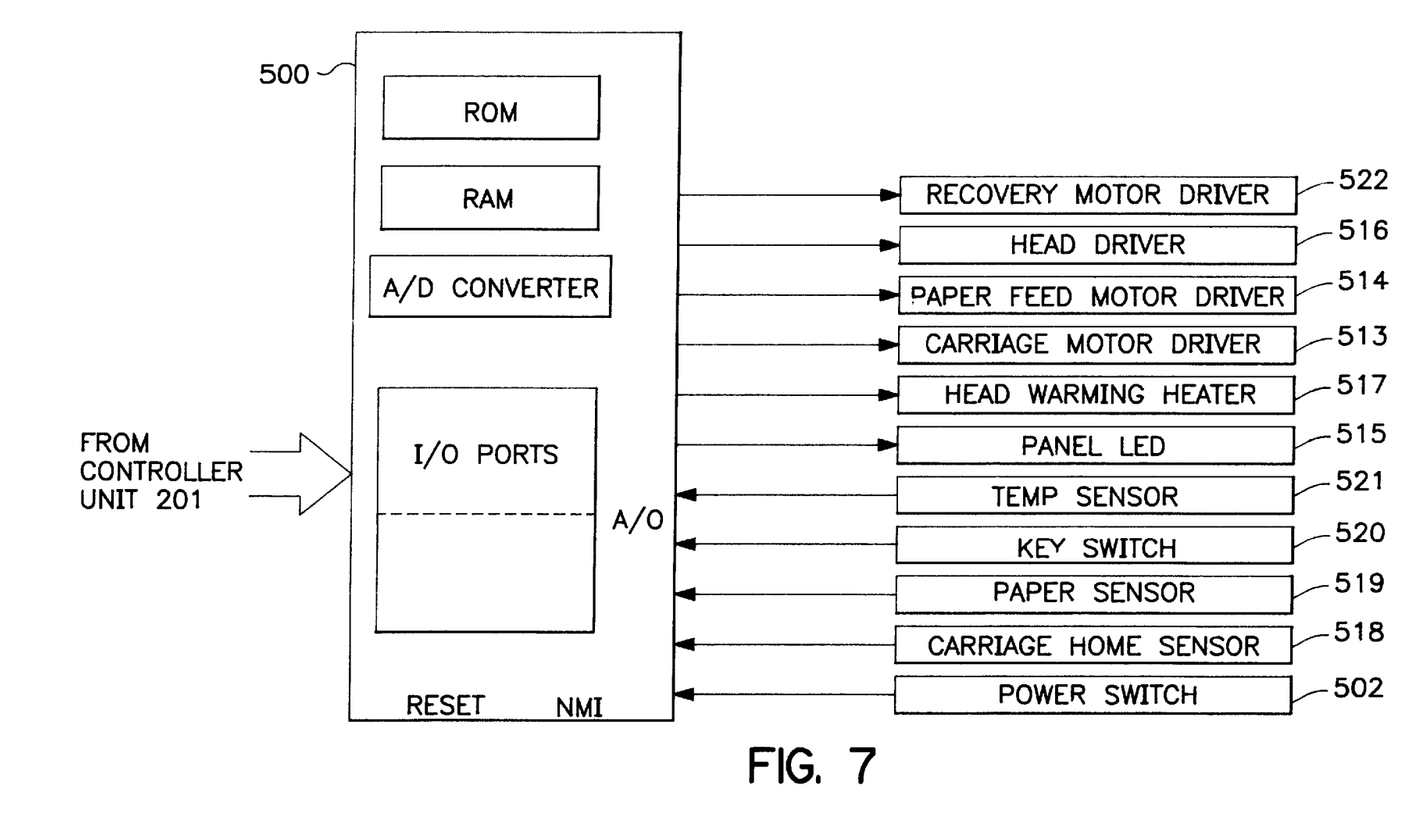
FIG. 7 is a block diagram showing a control section of the ink jet recording apparatus shown in FIG. 6.

FIG. 7 is a view showing an example of a hardware structure according to the present embodiment.

In FIG. 7, a reference numeral 500 denotes a one-chip microcontroller unit (referred to as MCU hereinafter) for controlling a printer, which contains a ROM, a timer, I/O ports, an A/D converter and so on. As the MCU 500, for example a TMP90C841 (Toshiba product) may be employed; 502 a power switch connected to a non-maskable interrupt port (referred to as NMI hereinafter) of the MCU 500; 513 a carriage motor driver connected to the output port of the MCU 500 for driving a carriage motor 517; 514 a motor driver for a paper feed motor (not illustrated); 515 a LED for panel indication; 516 a printer head driver for driving an ink jet head 20; 517 a warming heater driver for driving a warming heater provided on the ink jet head 20; 518 a carriage position sensor connected to the input port of the MCU 500; 519 a paper sensor; 520 a panel key switch; and 521 a thermistor for temperature detection connected to the A/D conversion port of the MCU 500, the thermistor being provided on a substrate.

The raster image data, which are developed in the controller unit 201 in a manner as mentioned above, are transmitted to the MCU 500 of the printer unit 202. Upon receipt of all the raster image data of the number of lines corresponding to the recording width of the ink jet head 20, MCU 500 serves to drive carriage motor through the carriage motor driver 513 so that main scanning is started by the carriage 16. The ink jet head 20 is driven by head driver 516 according to the image data to eject ink droplets on a recording sheet fed to the platen 24. After the main scanning, the paper feed motor is driven through the paper feed motor driver to transfer the recording sheet by a distance corresponding to the recording width, so that a sub-scan is performed. Similarly hereafter, a page of image recording is performed.

Other Embodiments

According to the embodiment as described above, there is a limit of a maximum 127 bytes for the compression in a horizontal direction, and thus it is impossible to perform the compression over such limit. It is noted that graphic data or interlinear spaces of a sentence have a higher probability that the same data appears in a vertical direction. If the exclusive OR operation involved in such data is performed, a result shows that the rasters are of a blank in its entirety. Thus, a set of a command indicating that the rasters are of a blank in its entirety would cause the compression rate to be improved. For example, the value 128 which is defined as a null according to the compression in the horizontal direction in the embodiment as described above, may mean that all of the rasters are 0.

Further, while the embodiment as described above is constructed in such a manner that each of the controller unit and the printer unit has an individual CPU, it may be so arranged that a single CPU controls both units.

According to the embodiments as described above, it is possible to perform the compression by means of only operations in units of bytes and thus to perform the compression and expansion at a sufficient speed on a software basis. Consequently, this does not lead to a cost increase owing to provision of the hardware. Further it is possible to improve the compression rate of the image data, thereby reducing the amount of data to be transmitted, and thus to perform recording without degradation of throughput of a recording apparatus even when the recording apparatus receives and records image data or printer driver software sends the image data by using a low speed serial interface.

While the embodiment as described above employ as a printer an ink jet printer in which ink droplets are ejected using a thermal energy, by way of example, the printer is not restricted in use to such type of printer. It is possible to employ various types of printer, for example, a piezo scheme of ink jet printer, a printer comprising a light beam generator such as a laser or the like and an electrophotographic process, or a thermal transfer scheme of printer.

The typical structure and operational principle of a recording apparatus of the ink jet system for performing recording by forming flying ink droplets by utilizing heat energy are preferably the ones disclosed for example in U.S. Pat. Nos. 4,723,129 and 4,740,796. This system is applicable to either a so-called on-demand type recording system or a continuous type recording system. Particularly, this system is effectively applicable to the on-demand type system for the following reason. When at least one driving signal that corresponds to recording information, and can give abrupt temperature rise exceeding nuclear boiling is applied to an electrothermal converting element arranged in correspondence with a sheet or liquid channel, which holds an ink, the electrothermal converting element generates heat energy, the heat energy causes film boiling on a heat acting surface of a recording head, and consequently, a bubble can be formed in the liquid (ink) in one-to-one correspondence with the driving signal. Upon growth and contraction of this bubble, the liquid (ink) is ejected through an ejection orifice, thereby forming at least one droplet. It is more preferable to define this driving signal to have a pulse waveform since a bubble can grow and contract instantaneously, and in particular, the liquid (ink) can be ejected in a short response time. As the driving signal having the pulse waveform, signals disclosed in U.S. Pat. Nos. 4,463,359 and 4,345,262 are suitable. Further excellent recording can be realized when conditions disclosed in U.S. Pat. No. 4,313,124 of the invention associated with the temperature rise rate of the heat acting surface are adopted.

As the structure of the recording head, in addition to a structure (linear liquid channel or a right-angle liquid channel) as a combination of ejection orifices, liquid channels, and electrothermal converting elements disclosed in the above-mentioned specifications, structures disclosed in U.S. Pat. Nos. 4,558,333 and 4,459,600 disclosing a structure having a heat acting structure arranged in a flexed region may be used. In addition, the recording head may be arranged based on Japanese Patent Application Laid-Open No. 59-123670 that discloses a structure wherein a common slit is used as an ejection portion for a plurality of electrothermal converting elements, or Japanese Patent Application Laid-Open No. 59-138461 that discloses a structure wheren an opening for absorbing a pressure wave of heat energy is formed in correspondence with the ejection portion. Those structures make it possible to expect effective advantages of the present invention, since the use of any type of recording head permits the recording to be reliably and effectively performed.

Furthermore, the present invention is effectively applicable to a full-line type recording head having a length corresponding to the maximum width of a recording medium, which can be used in recording of a recording apparatus, either a structure which satisfies this length by combining a plurality of recording heads or a structure as an integrally formed single recording head may be employed.

Also regarding the sort of the recording head to be equipped and the number thereof, it may be so arranged for example to provide a single recording head corresponding to monochromatic ink or a plurality of recording heads each corresponding to the associated one of a plurality of kinds of ink mutually different in recording color and density.

As described above, according to the present invention, a simple arithmetic operation makes it possible to compress the image information in not only a horizontal direction but also a vertical direction, and thus it is possible to improve the compression rate thereby attaining a higher processing speed.

The present invention is not limited to the particular embodiments described above. Various changes and modifications may be made within the spirit and scope of the invention.

What is claimed is:

1. A method of comprising image data comprising a plurality of n raster line to provide compressed data and outputting the compressed data to a data processing apparatus via a predetermined interface, comprising:

a first step of compressing a first raster line of image data in a horizontal direction without any exclusive OR operation processing and of outputting the corresponding compressed data, as data on the first raster line, to the data processing apparatus via the predetermined interface;

a second step of performing an exclusive OR operation processing between image data on a raster line i and image data on a raster line i-1;

a third step of compressing in a horizontal direction the information obtained by the exclusive OR operation processing in said second step;

a fourth step of outputting the compression information obtained in said third step, as data on the raster line i, to the data processing apparatus via the predetermined interface; and performing and second to fourth step for raster lines i=2 to n, irrespective of the contents of the image data on the raster line i, wherein when said exclusive OR operation processing produces a succession of plural lines of blanks, a predetermined command is outputted to the data processing apparatus via the predetermined interface.

2. A method of expanding image data compressed by a method according to claim 1 comprising:

a fifth step of receiving a first raster line and expanding the first raster line in a horizontal direction;

a sixth step of receiving information representing raster line i;

a seventh step of performing in a horizontal direction an expansion processing on the current raster line i received in said sixth step;

an eighth step of performing an exclusive OR operation processing between the expanded information representing the current line i obtained in said seventh step and information representing the expanded information of a preceding line i-1; and performing the sixth to eighth step for i=2 to i=n.

3. A method according to claim 2, which further comprises recording on a recording material in accordance with the image information obtained after the exclusive OR operation processing of the expanded image information.

4. A method according to claim 3, which further comprises recording an image by driving an energy generating element in accordance with image information so as to cause an ink droplet to be ejected from an orifice toward a recording material.

5. A method according to claim 4, which further comprises using a thermal energy generating element which generates thermal energy to cause a state variation ink to eject ink from the orifice.

6. A method according to claim 1, wherein the interface is a serial interface.

7. An apparatus for compressing image data comprising a plurality of n raster lines to provide compressed data and outputting the compressed data to a data processing apparatus via a predetermined interface, comprising:

means for performing an exclusive OR operation processing between image data on a raster line i and image data on a raster line i-1 to obtain information;

means for compressing a first raster line of image data in a horizontal direction without any exclusive OR processing to provide data on the first raster line, said compressing means further compressing in a horizontal direction the information obtained by the exclusive OR operation to provide compressed information; and means for outputting the data on the first raster line to the data processing apparatus via the predetermined interface and for outputting the compressed information as data on the raster line i to the data processing apparatus via the predetermined interface, said outputting means outputting a predetermined command to the data processing apparatus via the predetermined interface when said exclusive OR operation processing produces a succession of plural lines of blanks, said processing, compressing and outputting means being arranged to perform the exclusive OR processing, compressing and outputting for each of raster lines i=2 to n, irrespective of the contents of the image data on the raster line i.

8. An apparatus according to claim 7, wherein the interface is a serial interface.

9. A recording apparatus which expands compressed image data comprising a plurality of n raster lines, with the image data having been compressed according to a method of:

a first step of compressing a first raster line of image data in a horizontal direction without any exclusive OR operation processing and of outputting the corresponding compressed data, as data on the first raster line, to said recording apparatus via a predetermined interface;

a second step of performing an exclusive OR operation processing between image data on a raster line i and image data on a raster line i-1;

a third step of compressing in a horizontal direction information obtained by the exclusive OR operation processing in said second step;

a fourth step of outputting the compressed information obtained in said third step as data on the raster line i to said recording apparatus via the predetermined interface; and performing said second to fourth steps for raster lines i=2 to n, irrespective of the contents of the image data on the raster line i, wherein when said exclusive OR operation processing produces a succession of plural lines of blanks, a predetermined command is outputted to the recording apparatus via the predetermined interface, said recording apparatus comprising:

means for receiving the data on the raster lines as compressed by said method via the predetermined interface;

means for expanding the received data on the raster lines in a horizontal direction to provide expanded information;

means for performing an exclusive OR operation processing between the expanded information representing the raster line i and the expanded information representing a preceding raster line i-1; and means for processing the expanded information representing the first raster line and a result of the exclusive OR operation processing and for recording the resulting information as raster lines.

10. A recording apparatus according to claim 9, which comprises at least one energy generating element drivable in accordance with the processed information to cause ink to be ejected from an associated orifice toward a recording medium.

11. An apparatus according to claim 10, wherein the interface is a serial interface.

* * * * *

UNITED STATES PATENT AND TRADEMARK OFFICE
CERTIFICATE OF CORRECTION

PATENT NO. : 6,088,513
DATED : July 11, 2000
INVENTOR(S) : Yoshihiro Nakagawa et al.

It is certified that error appears in the above-identified patent and that said Letters Patent is hereby corrected as shown below:

Title page,
Item [54], Inventors, "Yoshihiro Nakagawa, c/o Canon Kabushiki Kaisha, 30-2, 3-chome, Shimomaruko, Ohta-ku; Masao Sasaki, c/o Canon Software Inc., Mita Miyoshi Bldg. 9-7, Mita 3-chome, Minato-ku, both of Tokyo, Japan" should read
-- [75] Inventors: Yoshihiro Nakagawa, Tokyo; Masao Sasaki, Kawasaki, all of Japan --.

Item [73], Assignee, insert -- [73] Assignee: Canon Kabushiki Kaisha, Tokyo, Japan --.

Column 1,
Lines 33 and 39, "a" should be deleted.

Column 2,
Lines 12, and 13, "a" should be deleted.

Column 3,
Line 30, "(FF-81)." should read -- (FF-81), --;
Line 52, "In" should read -- In a --; and
Line 62, "SAA" should read -- $AA --.

Column 4,
Line 1, "SAA." should read -- $AA. --;
Line 5, "SFA" should read -- $FA --; and
Line 18, "SFF" should read -- $FF --.

Column 6,
Line 15, "capping" should read -- capping, --.

Column 7,
Lines 2, and 32, "embodiment" should read -- embodiments --;
Line 10, "a command" should read -- commands --;
Line 30, "data" should read -- data, --; and
Line 36, "printer," should read -- printers, --.

UNITED STATES PATENT AND TRADEMARK OFFICE
CERTIFICATE OF CORRECTION

PATENT NO. : 6,088,513
DATED : July 11, 2000
INVENTOR(S) : Yoshihiro Nakagawa et al.

It is certified that error appears in the above-identified patent and that said Letters Patent is hereby corrected as shown below:

Column 8,
Line 14, "wheren" should read -- wherein -- ; and
Line 65, "and" should read -- said --.

Signed and Sealed this

Fifth Day of February, 2002

Attest:

JAMES E. ROGAN
*Director of the United States Patent and Trademark Office*

*Attesting Officer*